US007796042B2

(12) United States Patent
Walther et al.

(10) Patent No.: US 7,796,042 B2
(45) Date of Patent: Sep. 14, 2010

(54) DIRECT INTEGRATION OF RFID ELEMENTS INTO FOLDING BOXES

(75) Inventors: Thomas Walther, Offenbach (DE); Reinhard Baumann, Krailling (DE); Robert Weiss, Gersthofen (DE); Peer Dilling, Friedberg (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 283 days.

(21) Appl. No.: 11/922,287

(22) PCT Filed: Jun. 14, 2006

(86) PCT No.: PCT/EP2006/005694

§ 371 (c)(1), (2), (4) Date: Dec. 14, 2007

(87) PCT Pub. No.: WO2007/000245

PCT Pub. Date: Jan. 4, 2007

(65) Prior Publication Data

US 2009/0322478 A1 Dec. 31, 2009

(30) Foreign Application Priority Data

Jun. 24, 2005 (DE) ....................... 10 2005 029 489

(51) Int. Cl.
*G08B 13/14* (2006.01)

(52) U.S. Cl. ................... 340/572.8; 340/572.1; 156/60; 156/66

(58) Field of Classification Search .............. 340/572.8, 340/572.1, 10.1; 156/60
See application file for complete search history.

(56) References Cited

U.S. PATENT DOCUMENTS 6,019,865 A * 2/2000 Palmer et al. ............... 156/265

(Continued)

FOREIGN PATENT DOCUMENTS

EP 0 615 285 9/1994

(Continued)

OTHER PUBLICATIONS

English translation of International Preliminary Report on Patentability dated Jan. 24, 2008 issued in corresponding international application No. PCT/EP2006/005694.

(Continued)

*Primary Examiner*—George A Bugg
*Assistant Examiner*—Hongmin Fan
(74) *Attorney, Agent, or Firm*—Cohen Pontani Lieberman & Pavane LLP

(57) ABSTRACT

The aim of the invention is to simplify the attachment of RFID chips or RFID transponders to packagings. For this purpose, the RFID chips are produced as a single RFID label together with antenna elements that are functionally associated therewith. The chips or transponders can be attached to a packaging by means of corresponding devices during production of the printed material, during a subsequent treatment or finishing process of the printed material, during the preparation of the packaging, during production of the packaging or during filling of the packaging. At the time of attachment, the RFID chips can be tested and initialized. The invention allows to considerably simplify the so far complex processes required to integrate the RFID chips into different types of packaging.

17 Claims, 1 Drawing Sheet

Apply Fixing Agent — S102
Apply Chip — S104
Punching Process — S106
Printing Process — S108
Glueing Process — S110
Form Folding Box — S112
Check Chip — S114
Label Defective Pieces — S116
Dry/Cure — S118

U.S. PATENT DOCUMENTS 6,969,134 B2 * 11/2005 Hohberger et al. ............. 347/2
2003/0189490 A1 * 10/2003 Hogerton et al. ......... 340/572.8
2004/0070504 A1 * 4/2004 Brollier et al. ........... 340/572.8
2005/0051872 A1 3/2005 Kawamura et al.
2006/0250242 A1 * 11/2006 Drapala et al. ........... 340/572.1

FOREIGN PATENT DOCUMENTS

EP 0 861 788 9/1998
EP 1 069 645 1/2001
EP 1 284 320 2/2003

OTHER PUBLICATIONS

International Preliminary Report on Patentability dated Jan. 10, 2008 issued in corresponding international application No. PCT/EP2006/005694.

Search Report dated Aug. 10, 2006 for the underlying International Application No. PCT/EP2006/005694.

* cited by examiner

DIRECT INTEGRATION OF RFID ELEMENTS INTO FOLDING BOXES

CROSS REFERENCE TO RELATED APPLICATIONS

This is a U.S. national stage of application No. PCT/EP2006/005694, filed on 14 Jun. 2006. Priority is claimed on German Application No. 10 2005 029 489.8, filed on 24 Jun. 2005.

BACKGROUND OF THE INVENTION

1. Field of the Invention

The invention describes a method and devices for applying RFID chips with integrated antennas to packages, preferably retail packages for end consumers. Another object of the invention consists of devices which can be used to apply chips and which can be used in any desired stages of package production.

2. Description of Prior Art

RFID is the term used to designate methods for the automatic identification of objects by radio. The use of RFID systems is suitable in principle wherever it is necessary to label, to detect, to record, to store, to monitor, or to transport objects automatically. Many different variants of RFID systems are offered. In spite of the large bandwidth of RFID solutions, all RFID systems are defined by the following three properties:

1. Electronic Identification: The system makes it possible to identify objects uniquely by means of electronically stored data.

2. Contactless Data Transmission: For identification of the object, the data can be read out in wireless fashion over a radio frequency channel.

3. On-Call Transmission: A labeled object transmits its data only when a reader intended for this purpose initiates the process.

From a technical point of view, an RFID system consists of two components, namely, a transponder and a reader. The transponder—also called the "tag"—functions as the actual data storage medium. It is attached to an object (such to a commercial product or to a package) or integrated into an object (e.g., into a chip card), and the data in it can be read out by the use of radio technology without contact. Depending on the technology, data can also be written to it. The transponder consists basically of an integrated circuit and a radio frequency module. On the transponder, an identification number and additional data pertaining to the transponder itself or to the object to which it is attached are stored.

Current RFID technology is based on so-called "smart labels", which are glued onto the packaging. These labels have proved reliable in the logistics of large items but are not suitable for application to retail packages. First, smart labels are very expensive because of the expensive and complicated processes need to produce them. The end price for an applied label is in the range of €0.25-1.00. When these costs are put into relationship with the actual cost of producing a retail package, it can be seen that such smart labels can pay for themselves only when they are used for very expensive and complicated goods in the end-consumer area. But even here, the manufacturers of these packaged goods are hesitating to use these labels because of their high cost.

Another aspect which argues against the use of smart labels on retail packages is the fact that the retail package has not only a protective but also a marketing function. Because a smart label is glued on afterwards, it is difficult to integrate it into the packaging design and cheapens the image of the product in the consumer's eyes.

The use of RFID technology for consumer safety and tracking in the area of pharmaceuticals and food products and as a security element for high-value goods therefore necessitates a significant cost reduction versus the current technology of the smart label. As the production chain for the production of smart labels shows, this can be achieved only in part by the development of lower-cost chips. A large percentage of the overall cost is attributable to the very complex fabrication structure of today's smart label.

A first approach toward lowering the cost for retail packaging consists in printing the antenna directly onto the folding box and in bonding, stitching, or attaching in some other way the chip required for the RIFD function to the antenna structure in a subsequent step. It is true that costs can be lowered considerably by the reduction of the carrier material and the low-cost printing of the antenna structure, but the process of applying the chip is still very complicated, because the chip, which is very small, must be attached with high precision to the contacts of the antenna. The contact between the chip and the antenna must also remain ensured through the entire life cycle of the product. The contacts, however, are always subject to the danger of malfunction, which can be caused during the application of the chip, during exposure to flexural stresses during transport of the folding box, or during the process of filling the folding box.

A remedy is offered by chips into which the antenna has already been integrated. These chips represent a single structural unit; that is, the problem associated with the two-stage production of an RFID tag on a folding box, namely, first the printing of the antenna and then the bonding of the chip to the antenna, is eliminated. Contacts cannot come loose, and there is no longer any need for highly precise positioning of the chip. Through the use of such chips with integrated antenna, integration is possible even at high processing speeds during the multi-stage process of folding box production, because the job of aligning the chip precisely during the application process as required in the two-stage production process lowers the processing speed considerably. Chips with their own integrated antennas can therefore be easily integrated into a folding box, because the positioning requirements are very low. The chip simply must be present; the requirements on the position and orientation of the chip, as in the case of the two-stage production process, no longer apply. Transponder chips with an antenna integrated into the chip are also described today by the technical term "coil-on-chip".

Another advantage of chips with an integrated antenna is the small size of the overall RFID element (chip plus antenna) when the chip and the antenna are integrated into a single component. This small size makes it possible to integrate the element in a way which suits the design of the decoration on the folding box, but in addition it also becomes possible to integrate the element in an area of the folding box which, for space reasons, would not be possible for the larger RFID smart label. Concealed integration, which is desirable in many cases precisely for merchandise security reasons, is therefore easier to realize. The disadvantage of these chips with integrated antennas are the short reading ranges which they offer. For this reason, these chips are suitable primarily for applications in merchandise security, because they make it possible to identify product packages uniquely. By increasing the integration density, applications in logistics will also be possible in the future, such as in inventory control on department store shelves or in the handling of payment processes.

In the following, a typical production process for a folding box is described. For the production of a folding box, several panels are usually printed on a sheet of cardboard. This printed sheet is then usually varnished to protect it from abrasion, to improve its appearance, and to increase the quality of the final finish. The varnish can be applied in the varnishing unit of a printing press or outside the printing press in a separate varnishing machine. Then the printed sheet can be subjected to several finishing steps such as an embossing process. After the last finishing step on the entire sheet, the folding box panels are punched in a sheet-punching unit to create the individual panels or folding box sections. Simultaneously with or immediately after the punching process, the creases which make it possible to fold the box are introduced. The individual folding boxes are then separated in a break-out device or by hand, and the waste parts of the sheet are removed simultaneously. The individual folding box panels or folding box sections are then formed into a finished folding box in a gluing machine. For this purpose, glue is applied to one or more glue tabs of the folding box section or panel, and then the folding box is folded over a belt guide in such a way that the glue tab comes in contact with the inside surface of the opposite section of the folding box and is thus bonded to it. The effectiveness of the gluing step is usually assisted by the use of a pressing unit to increase the contact between the glue tab and the opposite side.

SUMMARY OF THE INVENTION

An object of the invention is to apply RFID chips with integrated antennas to folding boxes during the production process in such a way that the effort required to apply the chips is minimized and also so that the applied chip enjoys optimum protection. Special designs of machines for the application of the chip are also described.

In a first inventive embodiment, the chip with its own integrated antenna is applied to the glue tab in the gluing machine. The glue is preferably applied to the glue tab of the folding box; the chip is placed on the applied glue by an appropriate device; the folding box is folded; and finally the glue tab is glued to the inside surface of the opposite side of the box. The chip is now located between two layers of cardboard and held in place by the glue. It is therefore optimally protected by the two layers of cardboard. This method is made possible by the fact that the chip does not have to be positioned in any particular way and because no visual contact is required for the transmission of data to an RFID transponder. This approach also offers subsequent users, e.g., cashiers at a checkout counter, the advantage that the chip is in a defined location, namely, on the glue tab. Another significant advantage is the good protection which the cardboard offers the chip. It cannot be easily destroyed, because the packaging must be destroyed first to gain access to the chip. Nor can the chip be damaged by mistakes during the filling process. Optimal operational reliability, which is absolutely necessary for continuous tracking and logistics concepts, can thus be guaranteed with a high level of confidence.

According to another embodiment of the invention, the chip is applied during the printing process. Printed products and especially folding boxes are almost always varnished for both decorative and protective reasons. One possibility of mounting the chip consists in first applying varnish to the printed product inside the printing press and then placing the chip onto the varnish before it has dried and/or cured. During the further course of the printing run, the varnish and the chip are sent to a drying or curing device, which thermally dries the varnish and/or polymerizes the varnish film. The chip in this case is attached to the printed product by the varnish film; that is, the varnish serves not only its primary function as protective and/or decorative coating but also as a means of attaching the chip. The chip can be applied either indirectly to the printed product, in that the chip is sent to the varnish supply cylinder of a varnishing unit and then transferred jointly with the varnish to the printed product, or the chip can be applied directly to the varnish on the printed product after the varnish has been applied during passage through the printing press.

DETAILED DESCRIPTION OF THE PREFERRED EMBODIMENTS

Figure 1:
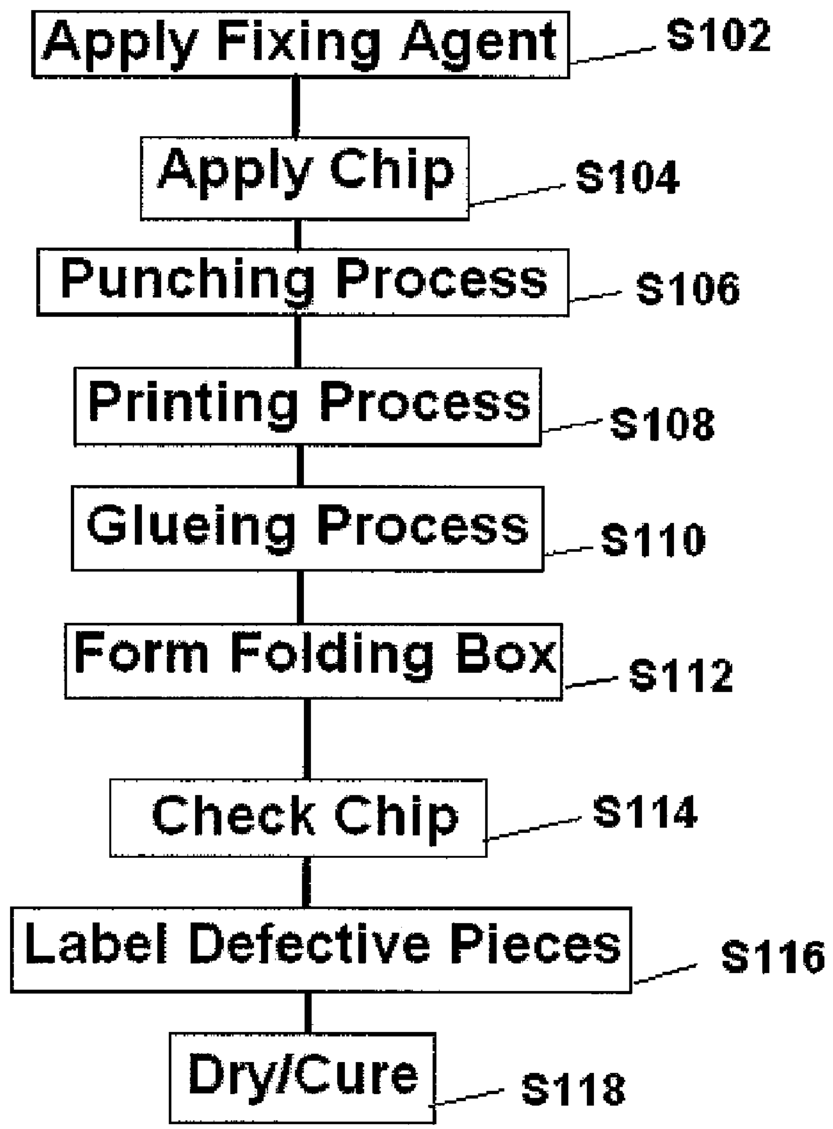
FIG. 1 is a flowchart for producing a package for a packaged product.

An essential advantage of the chip with integrated antenna is that, in comparison with the RFID technology involving a separation of chip and antenna, the requirements on the accuracy of fit of the application process are significantly less stringent. Thus there is no need for the chips to be positioned in a manner involving actual physical contact, e.g., by the use of assembly robots. Assembly involving physical contact inside a printing press, a glue machine, a sheet puncher, or a package-filling station by the use of the previously mentioned assembly robots, for example, always requires a movement and a position search, which slow down the actual process and thus limit productivity. The availability of an assembly system of this type is also limited, because complex sensors are required for the position search, and several movable elements are needed to execute the necessary movement. Because, in the case of the RIFD chip with integrated antenna, all of the components necessary for the operation of the transponder are located on one component, the requirements on positioning are not very high. One consequence of the lower requirements is that the application can be accomplished even if there is a gap between the substrate and the application machine. There is no longer any need for complex sequences of movement, and the complicated search for the correct mounting position is eliminated. Thus the chips can be mounted at application speeds which can keep pace with the normal speeds within the individual process steps of folding box production. Even in the case of a chip-mounting process which involves physical contact, however, the achievable speeds are still higher, because the complicated search for the correct position is eliminated.

The chips can be applied either separately from or jointly with the fixation agent. "Jointly with the fixation agent" signifies according to the invention that, for example, the fixation agent, e.g., a dispersion adhesive, is applied to the substrate through a nozzle and the chip. The joint application of the fixation agent and chip has the advantage that the chip is enveloped, wetted, or surrounded by the adhesive, and in any case is anchored on the substrate by the fixation agent. A separate, two-stage application of fixation agent and chip is also a variant in accordance with the invention, but it imposes higher requirements on positioning, because the point at which the chip is applied must coincide with that to which the fixation agent was applied during the preceding step.

The singling-out of the individual chips before they are applied represents a special requirement. The goal is usually to provide each folding box with only one chip, although, for reasons of functional reliability, the application of multiple chips is also conceivable. A folding box would then no longer be uniquely identified by the ID code permanently carried on its chip, however. The chips in this case would have to be provided with the same code in a data transfer step. Special requirements on the prevention of tampering could be guaranteed by allowing data to be written to the chip only once or by encrypting the data present on the chip. Such encryption, however, always requires corresponding decryption software in the reading and identification units.

To ensure both functional reliability and the continuity with which individual products can be tracked over the course of the entire logistics process, however, it is necessary for each package to contain at least one chip which has been tested to verify proper function. Chips which reveal malfunctions must therefore be ejected from the process by an ejection device before the chips are applied.

Picking out individual chips from a quantity of chips can be done by means of the known pick-and-place techniques, e.g., with suction arms. For this purpose, the chips must usually be arranged in a certain way, however. With the pick-and-place technique, the individual chip could be laid on a small conveyor belt equipped with an ejection device, above which the appropriate test sensors are mounted. The chip could then drop from the conveyor belt through an air gap onto the fixation agent on the folding box blank or be sent to the fixation agent dispenser.

Other singling-out techniques could also be used to pick individual chips out from a quantity not arranged in any particular order, such as techniques which operate by way of centrifuges with worm wheels or by blowing and suction techniques. Here, too, quality control must be ensured before the chips are applied.

According to another embodiment of the invention, the chip is supplied to an adhesive strip. The chip can either drop onto the strip, or it can be applied directly to the adhesive surface of the adhesive strip. This adhesive strip with the chip is then brought by a dispenser to packaging. Standard commercial adhesive strip dispensers can be used for this purpose. The advantage of this method is that the adhesive strip with the chip can be easily removed from the package again later. Customers can remove the chip easily after purchase, and thus concerns which consumers may have about continuous monitoring are avoided.

FIG. 1 is a flowchart for producing a package for packaging a product according to one embodiment of the invention. It should be noted that, where practical, the steps can be performed in any order. The package includes a packing material made of paper, cardboard, or plastic and an RIFD transponder integrated with the packing material. The RFID transponder is preferably formed on a one-piece chip with an antenna, an oscillator, and data. The method of producing the RFID transponder includes bonding the chip to the packing material using a fixation agent. The step of bonding comprises, during passage of the packing material through a printing press, applying, using at least one of a chip dispensing device or a chip applying device, the chip to a layer of varnish which has been previously applied to the packing material, whereby the varnish film is the fixation agent for the chip.

The fixation agent is applied to the packing material using a dispenser. (S102). Next, the chip is applied using a chip dispenser to the fixation agent. (S104). Preferably, an air gap is present between the opening of the chip dispenser and the fixation agent on the packing material at the time the chip is applied such that the chip is applied to the packing material without physical contact between the chip and the fixation agent when the chip is released from the chip dispenser. After the chip is applied, it preferably undergoes at least one of a drying and a curing process to dry the varnish film by a drying device. (S118).

In one embodiment, the application of the fixation agent (S102) and the application of the chip (S104) are carried out before at least one of one of a punching process (S106), a printing process (S108), or a gluing process (S110) on the packing material. In one embodiment, the application of the fixation agent (S102) and the application of the chip (S104) are carried out after at least one of one of a punching process (S106), a printing process (S108), or a gluing process (S110) on the packing material.

The packing material includes a folding box. Glue is applied to the glue tab of the folding box, the glue tab is then maneuvered so that it is brought together with an opposing side of the folding box. (S112). The chips are tested for functionality after the chips have been dispensed and fixed to the packing material. (S114). The pieces that fail the functionality test are identified and labeled using a marking device. Preferably, the defective packing material pieces are ejected from the production process. (S116).

What is claimed is:

1. A method for producing a package for packaging a product, the package including a packing material made of paper, cardboard, or plastic and an RIFD transponder integrated with the packing material, the RFID transponder being formed on a one-piece chip with an antenna, an oscillator, and data, said method comprising:

applying a layer of varnish to the packing material; and bonding the chip to the packing material using a fixation agent, wherein the bonding comprises, applying the chip to the layer of varnish during passage of the packing material through a printing press, using at least one of a chip dispensing device or a chip applying device, whereby the varnish film is the fixation agent for the chip.

2. The method of claim 1, wherein the step of bonding comprises applying the chip together with the fixation agent to the packing material using a dispenser.

3. The method of claim 1, wherein the step of bonding comprises first applying the fixation agent to the packing material, and then applying the chip using a chip dispenser in a subsequent substep.

4. The method of claim 3, wherein an air gap is present between the opening of the chip dispenser and the fixation agent on the packing material at the time the chip is applied such that the chip is applied to the packing material without physical contact between the chip and the fixation agent when the chip is released from the chip dispenser.

5. The method of claim 3, wherein the chip is dipped into the fixation agent by the chip dispenser at the time the chip is applied so that the chip physically contacts the fixation agent when the chip is released from the chip dispenser.

6. The method of claim 1, wherein the step of bonding comprises applying the chip to an adhesive surface of an adhesive strip, and then applying the adhesive strip together with the chip to the packing material.

7. The method of claim 1, wherein the application of the fixation agent and the application of the chip are carried out before one of a printing process, a punching process, or a gluing process on the packing material.

8. The method of claim 1, wherein the application of the fixation agent and the application of the chip are carried out during one of a printing process, a punching process, or a gluing process on the packing material.

9. The method of claim 1, wherein the application of the fixation agent and the application of the chip are carried out after one of a printing process, a punching process, or a gluing process on the packing material.

10. The method of claim 1, wherein the packing material includes a folding box with a glue tab and wherein the step of bonding comprises applying the chip, together with or separately from glue, to the glue tab of the folding box, and maneuvering the glue tab so that it is brought together with an opposing side of the folding box, the chip being located between the glue tab and the opposite side which have been glued to each other after the step of maneuvering.

11. The method of claim 10, wherein the step of bonding comprises applying the chip to the packing material using a chip dispenser, wherein chip dispenser is actuated by a control unit of a glue dispenser device.

12. The method of claim 1, further comprising the step of checking the chips for functionality after the chips are separated into individual units and before they are dispensed onto the package.

13. The method of claim 1, further comprising the step of testing the chips for functionality after the chips have been dispensed and fixed to the packing material.

14. The method of claim 13, further comprising the steps of identifying pieces of packing material which failed said step of testing, labeling the failed pieces of packing material as defective using a marking device, and ejecting the defective packing material pieces from the production process after a punching process or during passage through a gluing machine.

15. The method of claim 1, wherein the step of bonding comprises applying a dot of the fixation agent using a dispenser in a folding box set-up machine immediately before the box is filled in a final packaging machine, and then mounting the chip on the dot of the fixing agent.

16. The method of claim 15, wherein the process of applying the fixation agent and the application of the chip are carried out in two different work steps in the final packaging machine.

17. The method of claim 1, further comprising the step of at least one of drying and curing the varnish film by a drying device after the chip is applied.

* * * * *